(12) United States Patent
Alikhani et al.

(10) Patent No.: US 11,259,898 B2
(45) Date of Patent: Mar. 1, 2022

(54) ORTHODONTIC SYSTEM AND DEVICE

(71) Applicant: New York University, New York, NY (US)

(72) Inventors: Mani Alikhani, New York, NY (US); Cristina Teixeira, New York, NY (US); Serafim Oliveira, Viseu (PT); Chinapa Sangsuwon, Jersey City, NJ (US)

(73) Assignee: NEW YORK UNIVERSITY, New York, NY (US)

( * ) Notice: Subject to any disclaimer, the term of this patent is extended or adjusted under 35 U.S.C. 154(b) by 274 days.

(21) Appl. No.: 16/314,070

(22) PCT Filed: Jul. 7, 2017

(86) PCT No.: PCT/US2017/041170
§ 371 (c)(1),
(2) Date: Dec. 28, 2018

(87) PCT Pub. No.: WO2018/009848
PCT Pub. Date: Jan. 11, 2018

(65) Prior Publication Data
US 2019/0167385 A1 Jun. 6, 2019

Related U.S. Application Data

(60) Provisional application No. 62/359,493, filed on Jul. 7, 2016.

(51) Int. Cl.
*A61C 7/14* (2006.01)
*A61C 7/22* (2006.01)
(Continued)

(52) U.S. Cl.
CPC ............. *A61C 7/14* (2013.01); *A61C 7/008* (2013.01); *A61C 7/22* (2013.01); *A61C 7/28* (2013.01); *A61C 7/30* (2013.01); *F16H 19/04* (2013.01)

(58) Field of Classification Search
CPC ..... A61C 19/05; A61C 9/0053; A61C 9/0006; A61C 3/00; A61C 7/14; A61C 7/008;
(Continued)

(56) References Cited

U.S. PATENT DOCUMENTS 5,302,121 A  4/1994 Gagin
5,595,484 A  1/1997 Orikasa et al.
(Continued)

FOREIGN PATENT DOCUMENTS

WO   2014/083565   6/2014

*Primary Examiner* — Nicholas D Lucchesi
*Assistant Examiner* — Hao D Mai
(74) *Attorney, Agent, or Firm* — Fay Kaplun & Marcin, LLP

(57) ABSTRACT

An orthodontic device and, in particular, an orthodontic bracket that is slidable along a wire without external forces is provided. The device may include a first and second gear, each of which are independently movable between a locked position in which the gear is prevented from rotation, and a released configuration in which the gear extends into the channel to engage a wire received within the channel and is rotatable to move the device along the wire. The first gear may be rotatable to move the device in a first direction while the second gear may be rotatable to move the device in a second direction opposite the first direction. Thus, the first and second gears have the ability to move along the wire in short or long distances, as desired.

16 Claims, 8 Drawing Sheets

(51) Int. Cl.
  *A61C 7/30* (2006.01)
  *A61C 7/00* (2006.01)
  *A61C 7/28* (2006.01)
  *F16H 19/04* (2006.01)

(58) Field of Classification Search
  CPC .... A61C 7/22; A61C 7/28; A61C 7/30; G06T 17/00; F16H 19/04
  See application file for complete search history.

(56) References Cited

U.S. PATENT DOCUMENTS

| | | | |
|---|---|---|---|
| 5,857,850 A | * | 1/1999 | Voudouris ................ A61C 7/28 433/11 |
| 5,954,502 A | | 9/1999 | Tuenge et al. |
| 7,431,586 B1 | | 10/2008 | Silverman |
| 7,731,496 B2 | | 6/2010 | Minium |
| 8,113,828 B1 | | 2/2012 | Greenfield |
| 8,371,846 B2 | | 2/2013 | Kishi |
| 2003/0031975 A1 | | 2/2003 | Voudouris |
| 2011/0300502 A1 | | 12/2011 | Kishi |
| 2013/0323667 A1 | | 12/2013 | Staley |
| 2014/0065568 A1 | | 3/2014 | Rahimi |
| 2014/0134562 A1 | | 5/2014 | Wu et al. |
| 2014/0205962 A1 | | 7/2014 | Damon et al. |
| 2014/0208894 A1 | | 7/2014 | Miller |
| 2015/0238281 A1 | | 8/2015 | Alauddin et al. |
| 2017/0128164 A1 | * | 5/2017 | Bindayel ................ A61C 7/002 |

* cited by examiner

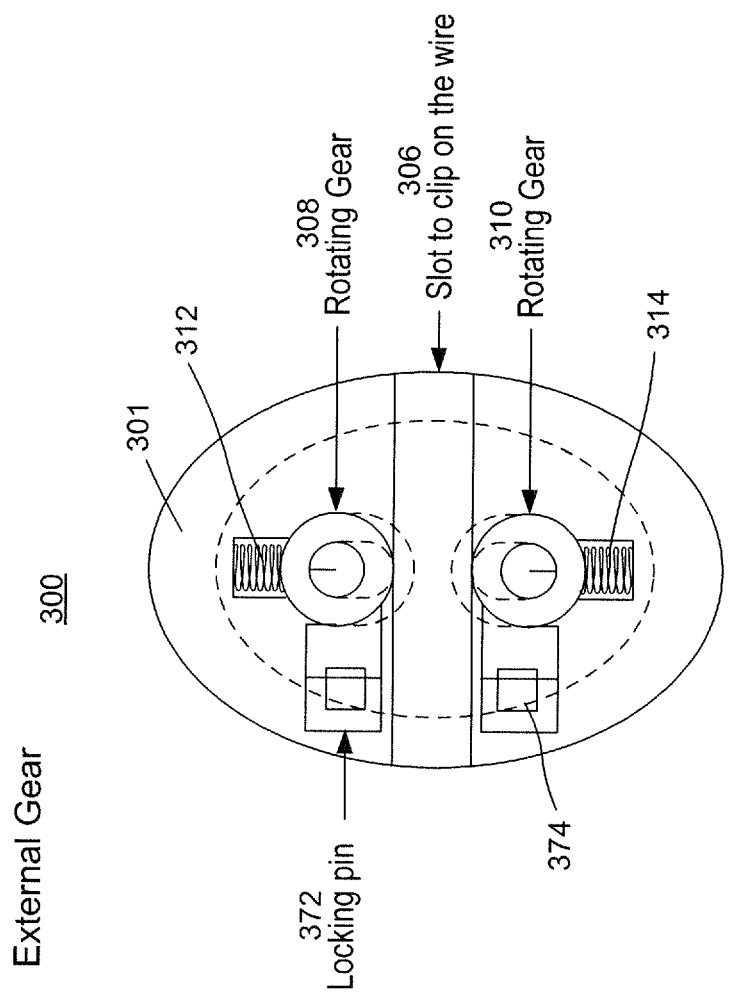
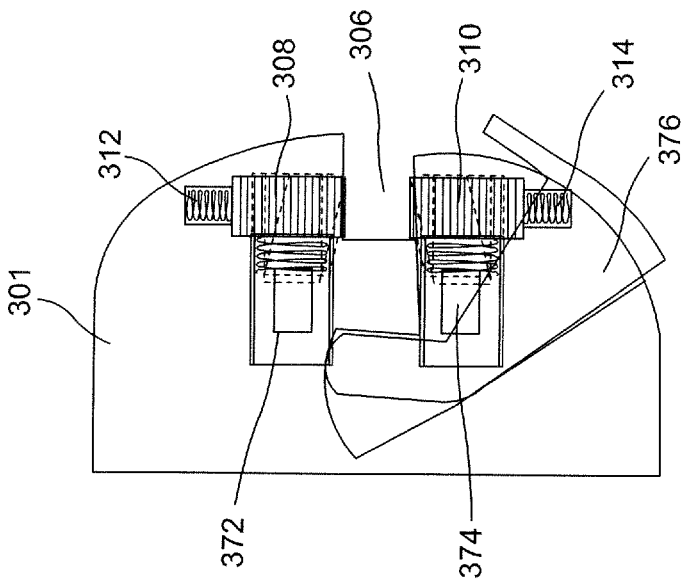
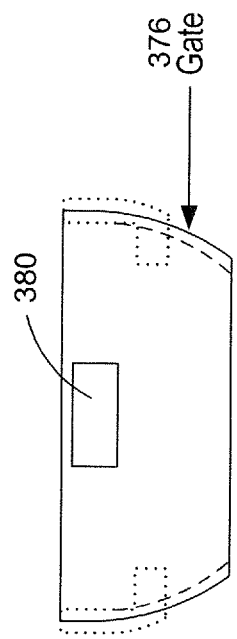
Fig. 17
Fig. 18
Fig. 19

ORTHODONTIC SYSTEM AND DEVICE

PRIORITY CLAIM

The present application is a 371 Application of PCT Patent Application Serial No. PCT/US2017/041170 filed Jul. 7, 2017 which claims priority to U.S. Provisional Application Ser. No. 62/359,493 entitled "System and Device for Orthodontic Brackets" filed on Jul. 7, 2016. The entire contents of the above applications is hereby incorporated by reference herein.

BACKGROUND

Braces have been the primary method of treating orthodontic issues such as, for example, crowding of the teeth, generalized or localized spacing, expansion of the dental arch, constriction of the dental arch, closure of extraction spaces, opening of spaces for implant or fixed prosthesis, moving midlines, correction of overjet (i.e., distance between upper and lower anterior teeth) and protraction and retraction of the whole dentition. Orthodontics treatment is based on interaction between wire and fixed orthodontic brackets (braces or attachments) that are attached by different methods to the surface of a tooth. For alignment of the teeth, metal wires are inserted into orthodontic brackets (braces or attachments), which are adhered to the teeth. The wire receives a small deflection from braces and produces the desire forces and/or moments to move the teeth. The teeth are then moved toward or away from one another, along the wire, to close or open spaces therebetween, as required.

After alignment of the teeth to a desired orientation, the patient may also need to adjust spacing between each of the teeth by further opening a distance between two teeth or closing that distance to reduce the space between two teeth. For example, the patient may need adjustments to the spacing between each of the teeth by moving each towards or away from adjacent teeth as in treatment of generalized or localized spacing, expansion of the dental arch, constriction of the dental arch, closure of extraction spaces, opening of spaces for implant or fixed prosthesis, moving midlines, correction of overjet (distance between upper and lower anterior teeth) and protraction and retraction of the whole dentition. To adjust the spacing between each of the teeth, an orthodontist may first align the position of the teeth in an initial phase of treatment such that a straight rigid wire may pass through orthodontic braces or brackets attached to the teeth. For example, the first step may include moving a tooth into alignment about an apico-coronal axis, huccopalatal axis, and/or inesial-distal axis, without shifting the position of a root of the tooth. In a second stage of orthodontic adjustments, the spacing between each of the teeth, e.g., the positioning of the roots of the teeth, may be shifted to adjust the lateral spacing of the teeth. A force may be applied to adjust the lateral spacing of the teeth using externally installed metal closing/opening springs or rubber materials, called power chain or power thread, which pulls or pushes each tooth along the wire in a similar manner as pulling or pushing a train car along a track.

Conventional orthodontic brackets (braces or attachments) are typically designed to be passive devices that receives external force and does not impart its own force to the teeth. The conventional orthodontic brackets generally do not include any form of mechanism that would generate or impart a force to the teeth. Instead, the braces may, for example, be pushed or pulled along a wire by an external mechanism, e.g., an elastic material such as a rubber band or a spring. However, these conventional external mechanisms suffer from structural weakness, lack of targeting of the external forces to the desired locations, discomfort to the patients, and require extensive repositioning by orthodontist. Specifically, elastic materials used to impart an external force may suffer from significant force decay, e.g., loss of elasticity after 24 to 48 hours, and would therefore, require an orthodontist to constantly renew their application/insertion to maintain a desired external force. This continuous renewal of the elastic materials that impart external forces to the teeth is a tedious and requires frequent and time-consuming adjustments by the orthodontists. Additionally, in order to apply an external force to a desired tooth using the conventional external mechanisms, an elastic material must be attached at two different points: typically, a target tooth, which is the tooth that is desired to be moved, and an anchor unit, which may include a single tooth or a plurality of teeth. The elastic material not only exerts a force against the target tooth, it also imparts a force to the anchor unit, and, therefore, the externally applied force may move not only the target tooth, but also the anchor tooth or anchor teeth. Furthermore, external force tools, such as springs and/or elastic bands, have typically been very bulk, which can cause hygiene problems and significant discomfort and/or irritation to the patient. For example, the external elastic mechanism may include a spring or power chain in combination with additional hooks inside the mouth to secure the elastic device to the target and anchor teeth. Such a design may be bulky, and may also add significant mechanical complexity to such an orthodontic system design.

Therefore, there is a need for an orthodontic system that can apply a force to a tooth in a targeted manner that can be easily adjusted based on the needs of the clinician and required tooth movements during the treatment.

SUMMARY OF THE INVENTION

In accordance with the foregoing objectives and others, one embodiment of the present invention provides an orthodontic device for imparting a force in a mesial-distal direction of a tooth. The orthodontic device comprises a body portion having a channel extending from a first end to a second end through the body portion. The channel is configured to slidably receive an archwire therethrough. The orthodontic device also comprises a first gear coupled to the body portion. The first gear coupled is movable between a first locked configuration in which the first gear is prevented from rotation, and a first released configuration in which the first gear engages an archwire received within the channel and is rotatable to move the device along the wire in a first direction. The orthodontic device further comprises a second gear coupled to the body portion. The second gear is movable between a second locked configuration in which the second gear is prevented from rotation, and a second released configuration in which the second gear engages an archwire received within the channel and is rotatable to move the device along the wire in a second direction. The second direction is opposite the first direction. In addition, the first gear may be biased towards the first released configuration, and the second gear is biased towards the second released configuration.

The orthodontic device may further comprise a first biasing element, such as e.g., a spring, biasing the first gear towards the first release configuration. The first biasing element may be compressed when the first gear is in the first locked position such that release of the first biasing element imparts a first force to rotate the first gear in the first direction. In addition, the orthodontic device may comprise a second biasing element, such as e.g., a spring, biasing the second gear towards the second released configuration. The second biasing element may be compressed when the second gear is in the second locked position such that release of the second biasing element imparts a second force to rotate the second gear in the second direction. The device may further comprise a first locking lever pivotally movable between a first locking position in which the first locking lever compresses the first biasing element and a first release position in which the first locking lever is pivoted away from the first biasing element. The device may also comprise a second locking lever pivotally movable between a second locking position in which the second locking lever compresses the second biasing element and a second release position in which the second locking lever is pivoted away from the second biasing element.

The orthodontic device may be an orthodontic bracket configured to be attached to a tooth of a patient. The device may further comprise a base portion configured to be attached to a surface of a tooth, wherein the body portion is removably attachable to the base portion. Alternatively, the orthodontic device may be reversibly attachable to the archwire between a first orthodontic bracket attached to a first tooth and a second orthodontic bracket attached to a second tooth adjacent to the first tooth.

In another aspect, an orthodontic system is provided. The orthodontic system comprises an archwire. The orthodontic system also comprises a device having a channel extending from a first end to a second end therethrough. The channel being configured to slidably receive an archwire therethrough. The orthodontic system further comprises a first gear coupled to the device. The first gear is movable between a first locked configuration in which the first gear is prevented from rotation, and a first released configuration in which the first gear engages the archwire received within the channel and is rotatable to move the device along the wire in a first direction. The orthodontic system also comprises a second gear coupled to the body portion. The second gear is movable between a second locked configuration in which the second gear is prevented from rotation, and a second released configuration in which the second gear engages an archwire received within the channel and is rotatable to move the device along the wire in a second direction opposite the first direction. The archwire may be formed from stainless steel or a titanium-molybdenum alloy. In some embodiments, the archwire has a circular or rectangular cross-sectional shape. In one embodiment, at least a portion of the archwire is corrugated. For example, an anterior portion or a posterior portion of the archwire may be corrugated. In some examples, the corrugation may include a plurality of grooves around a cross-section of the archwire. In other examples, the corrugation may include a plurality of grooves extending half of a cross-section circumference of the archwire.

The orthodontic system may further comprise a first spring biasing the first gear towards the first released configuration. The first spring may be compressed when the first gear is in the first locked position such that release of the first spring imparts a first force to rotate the first gear in the first direction. The orthodontic system may also comprise a first locking lever pivotally movable between a first locking position in which the first locking lever compresses the first spring and a first release position in which the first locking lever is pivoted away from the first spring.

In one embodiment, the orthodontic system may comprise a first orthodontic bracket attached to a first tooth, and a second orthodontic bracket attached to a second tooth adjacent to the first tooth. The device may be reversibly attachable to the archwire between the first and second orthodontic brackets. In another embodiment, the device may be an orthodontic bracket.

In a further aspect, an orthodontic device is provided. The device may comprise a body portion having a channel extending therethrough from a first end to a second end. The channel may be configured to slidably receive an archwire therein. The device may further comprise a first gear coupled to the body portion. The first gear may be movable between a first locked configuration in which the first gear is prevented from rotation, and a first released configuration in which the first gear engages an archwire received within the channel and is rotatable to move the device along the wire in a first direction. The device may also comprise a second gear coupled to the body portion. The second gear may be movable between a second locked configuration in which the second gear is prevented from rotation, and a second released configuration in which the second gear engages an archwire received within the channel and is rotatable to move the device along the wire in a second direction opposite the first direction. The device further comprises a first biasing element biasing the first gear towards the first released configuration. The device also comprises a second biasing element biasing the second gear towards the second released configuration.

These and other aspects of the invention will become apparent to those skilled in the art after a reading of the following detailed description of the invention, including the figures and appended claims.

BRIEF DESCRIPTION OF THE DRAWINGS

FIG. 17 shows a front view of an orthodontic device according to an alternative exemplary embodiment of the present invention.

FIG. 18 shows a front view of a gate of the exemplary orthodontic device of FIG. 17.

FIG. 19 shows a side view of the exemplary orthodontic device of claim 17.

DETAILED DESCRIPTION

Figure 1:
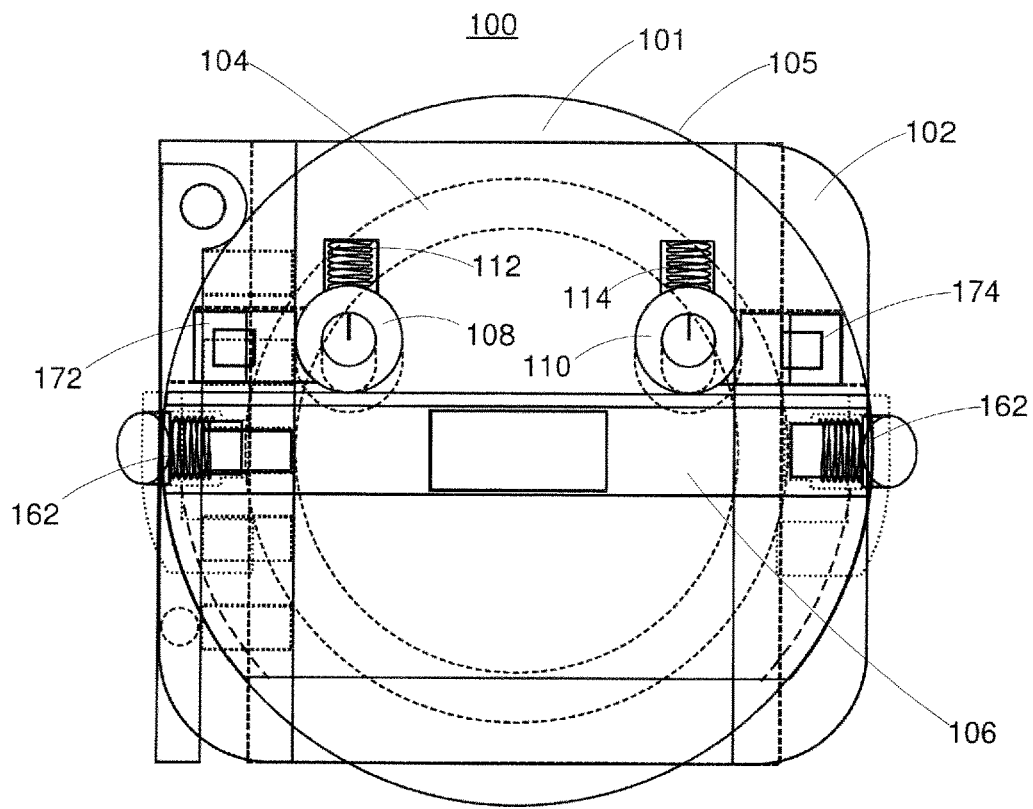
FIG. 1 shows a front view of an orthodontic bracket device according to an exemplary embodiment of the present invention.

The present invention relates to an orthodontic device that is slidable along a wire without application of external forces. The orthodontic device may be part of an orthodontic bracket, or may be separate device that can be sided and shaped to be fitted between two orthodontic brackets in an operating configuration (e.g., attached to the teeth of a patient) and slidable along a wire, in particular, the device may be slidable between the two brackets.

In particular, exemplary embodiments of the present invention may include a bracket device including at least one gear adjacent to a channel of a body portion of the bracket device, each of gear being independently movable between a locked configuration in which the gear is prevented from rotation and a released configuration in which the gear is rotatable to move an archwire within the channel. More particularly, the orthodontic bracket device may include a first gear and a second gear. The first gear may be rotatable in a first direction while the second gear may be rotatable in a second direction opposite the first direction. Thus, the first and second gears have the ability to move along the wire in short or long distances, as desired.

In an alternative embodiment, the orthodontic device may be sized and shaped to fit between two orthodontic brackets in an operating configuration (e.g., attached to the teeth of a patient). The device may comprise a housing or a body portion enclosing at least one gear adjacent to a channel of the device configured to receive an archwire therein. In some embodiments, the device may be configured transversely attach to an archwire between two orthodontic brackets in an operating configuration, e.g., attached to the teeth of the patient. In certain embodiments, the device may be configured to reversibly attach and disengage transversely from an archwire. Each gear of the device may be independently movable between a locked configuration in which the gear is prevented from rotation and a released configuration in which the gear is rotatable to move along an archwire within the channel. More particularly, the orthodontic device may include a first gear and a second gear. The first gear may be rotatable in a first direction while the second gear may be rotatable in a second direction opposite the first direction. Thus, the first and second gears have the ability to move along the wire and push against an adjacent orthodontic bracket, as desired.

The exemplary embodiment of an orthodontic device (either an orthodontic bracket or a separately attachable device figured to fit between orthodontic brackets) described herein is capable of imparting a force to move the teeth without the addition of external biasing elements that apply an external force to push or pull one or more teeth while being anchored to another tooth that does not require such treatment, such as, for example, rubber bands and/or springs. Conventional orthodontic brackets require the use of external elastic elements, e.g., rubber bands and/or springs, that are attached externally to targeted brackets to impart either a push or pulling force to the teeth in a desired direction. In contrast, the exemplary embodiment of an orthodontic device described herein includes a built-in biasing mechanism within the orthodontic device for imparting a force to a tooth. As indicated above, the device may be an orthodontic bracket or a separate evice that can be fitted between two orthodontic brackets to impart a force, without the addition of an elastic component pulling or pushing the device.

For example, the orthodontic device may include one or more biasing mechanisms, e.g., springs, to impart a force for adjusting the positioning of a tooth. The force may be, for example, in the form of a spring compression force that may be unlocked and/or adjusted by a clinician (e.g., orthodontist) to impart a force to achieve a desired amount of lateral movement (e.g., in a mesialdistal direction) to a tooth. More particularly, the biasing mechanism may be operably coupled to a gear such that upon release of a spring compression force from the biasing mechanism, a force is applied to rotate the gear in a desire direction along a wire (e.g., an archwire) inserted therethrough, such as for example, along a mesial-distal direction of a patient's teeth, when the device is installed in an operating configuration, e.g., attached to the teeth of the patient (if the device is an orthodontic bracket) or attached to an archwire and fitted between two orthondontic brackets (if it is a separate device). The rotation of the gear imparts a lateral force that may be used to push or pull a target tooth in a desired direction to induce movement of the tooth in the desired direction, e.g., a desired mesial-distal direction. The amount of spring compression force released from the biasing mechanism may be adjusted via any suitable mechanism such that a desired portion of the spring compression force stored within the biasing mechanism is released. In some embodiments, the orthodontic device may include two biasing mechanisms arranged to impart forces in opposite directions, the biasing mechanisms being individually operable to move an individual tooth or a group of teeth in either a first direction or a second direction substantially opposite the first direction—e.g., in a mesial direction vs. a distal direction of a tooth.

To adjust the spacing between each of the teeth, an orthodontist may first align a position of the teeth in an initial phase of treatment such that a straight rigid wire may pass through orthodontic braces or brackets attached to the teeth. Subsequently, the orthodontist may adjust spacing between each of the teeth by further opening a distance between two teeth or by closing that distance to reduce a space between the two teeth. The exemplary embodiments of an orthodontic device described herein may be useful for adjusting the mesial-distal spacing between teeth after alignment of each of the teeth to a desired orientation about an apico-coronal axis, buccopalatal axis, and/or mesial-distal axis. For example, the exemplary orthodontic device may be useful in closure of space after tooth extraction, protraction of whole dental arch, retraction of whole dental arch, canine, retraction, correction over overjet (relation between upon and lower anterior teeth), expansion of the arch, construction of the arch, orthopedic screws for expansion or construction, etc.

In certain embodiments, the exemplary orthodontic devices may be configured for use in combination with a corrugated wire, such as a fully corrugated or a partially corrugated archwire. The combination of the exemplary orthodontic devices and a corrugated wire may be configured to produce a desired amount of force as selected by the clinician/orthodontist and, therefore, be activated to apply desired amounts of force, and selected to translate a tooth or teeth a desired length along the wire, without undesired force or movement. In particular, the lateral translation of the exemplary orthodontic devices along the wire may be limited by the shape of the wire itself, specifically, the corrugated shape of the wire. For example, a distance between grooves and peaks and/or height of the grooves and peaks of the corrugated wire may limit a magnitude of force, continuity of force, and/or period of activation that is imparted from the release of a spring compression force from the orthodontic bracket to the target tooth.

In some embodiments, the one or more biasing mechanisms may be incorporated within each orthodontic device. Therefore, the orthodontic braces would not require the use of external elastic elements, e.g., rubber bands (power chain) or springs, that have typically been bulky and which can be uncomfortable by for example, irritating nearby soft tissue. In addition, such external elastic elements are often difficult to clean and may compromise oral hygiene. These external elastic elements, e.g., rubber bands, often suffer from lack of structural integrity and can break or separate unexpectedly, and thereby adding additional emergency visits to orthodontists to remedy such mechanical failures. Furthermore, these external elastic elements may also suffer loss of elasticity within a relatively short period of time, e.g., 24-48 hours, and may therefore, require additional visits to the orthodontist to change or activate the external elastic mechanism so that a desired force may be applied to the target tooth. These visits are time consuming, costly, and may be uncomfortable for the patient. In some embodiments of the orthodontic device described herein, the device may be an orthodontic device having a biasing mechanism that may be built-in to the bracket itself, providing an improved way for imparting lateral force to a tooth.

The present invention may be further understood with reference to the following description and the appended drawings, wherein like elements are referred to with the same reference numerals. The present invention relates to an orthodontic device and, in particular, relates to an orthodontic device that is slidable along a wire without requiring externally applied forces. In particular, exemplary embodiments of the present invention describe an orthodontic bracket including first and second gears, each of which is independently movable between a locked position in which the gear is adjacent a channel of a body portion of a bracket and prevented from rotation, and a released configuration in which the gear extends into the channel to engage a wire received within the channel and is rotatable to move the bracket along the wire. The first gear is rotatable in a first direction while the second gear may be rotatable in a second direction opposite the first direction. Thus, the first and second gears may move the orthodontic bracket along the wire in either direction across short or long distances, as desired.

As shown in FIGS. 1-6, an orthodontic bracket device 100 according to an exemplary embodiment of the present invention, comprises a base portion 102 configured to be attached to a surface of a tooth and a body portion 101 moveably and/or removably attachable to the base portion 102. The body portion 101 may have any suitable configuration including a channel 106 for receiving a wire therethrough.

In one exemplary embodiment, the body portion 101 comprises an inner portion 104 and a housing portion 105 removably attachable to the inner portion. The housing portion includes the channel 106 for receiving a wire therethrough. In another example, the body portion 101 may include any suitable self-ligating orthodontic bracket. In particular, the body portion 101 may include an inner portion 104, and a housing portion 105 movably coupled to the inner portion 104, where the housing portion 105 includes a self-ligating orthodontic bracket, including a movable portion that can be manipulated to an open configuration permitting a wire to be inserted lengthwise into channel 106, and a closed configuration where the movable portion is closed to surround the length of the wire. Any suitable self-ligating orthodontic bracket may be incorporated into the body portion 101, such as, for example, speed brackets commercially available from Strite Industries, Damon System, Clarity SL, Carriere LX by Ortho Organizers, and In-Ovation R, In-Ovation C, and In-Ovation L by Dentsply GAC.

The body portion 101 includes one or more biasing mechanisms, e.g., springs, to impart a force for adjusting the positioning of a tooth to which the bracket device 100 is attached. In one exemplary embodiment, the body portion 101 includes at least one spring in a compressed configuration coupled to a gear such that upon relaxation of part or all of the spring, a spring compression force is released and translates into rotational movement of the gear. Each gear is positioned adjacent to the channel 106, and is independently movable between a locked position in which the gear is prevented from rotation and a released configuration in which the spring is at least partially uncompressed and the gear is rotatable to move along a wire received within the channel 106 in a desired direction.

In one exemplary embodiment, the body portion 101 of the orthodontic bracket 100 may includes a first gear 108 and a second gear 110. The first and second gears 108, 110 may include a plurality of corrugations around the circumferences of each of the first and second gears 108, 110. The peaks and indentations surrounding each gear 108, 110 may have any desired size and shape. In one particular embodiment, each gear 108, 110 has a corrugated shape with uniformly sized and shaped peaks and indentations around the circumference thereof.

Figure 7:
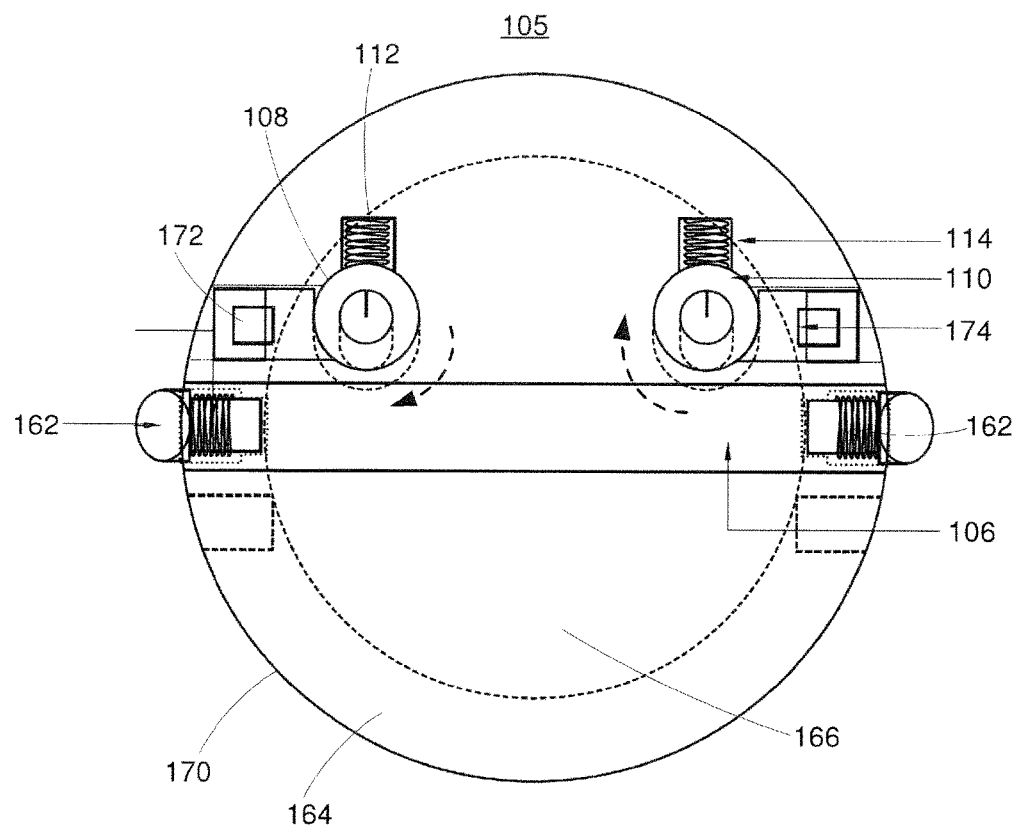
FIG. 7 shows a front view of a housing portion of the exemplary orthodontic bracket device of FIG. 1.
Figure 8:
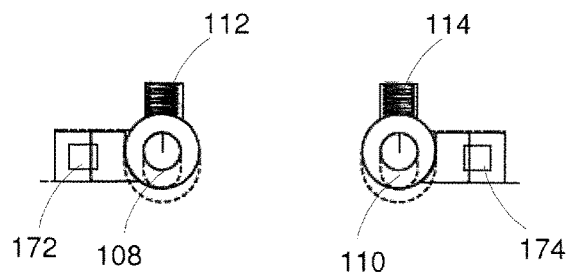
FIG. 8 shows a front view of the exemplary rotatable gears and biasing elements of the exemplary orthodontic bracket device of FIG. 1.
Figure 9:
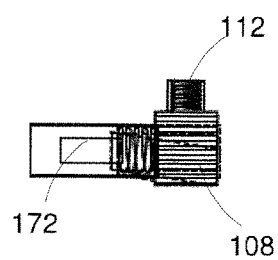
FIG. 9 shows a side view of the exemplary rotatable gears and biasing elements of FIG. 8.
Figure 10:
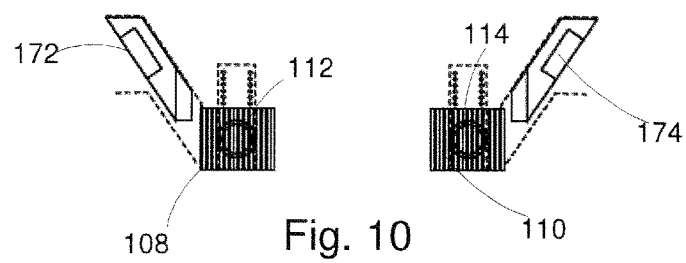
FIG. 10 shows a top view of the exemplary rotatable gears and biasing elements of FIG. 8.

The first gear 108, in this embodiment, is rotatable in a first direction while the second gear 110 is rotatable in a second direction opposite the first direction. In the released configuration, either the first gear 108 or the second gear 110 is rotatable about a central axis, which may, for example, be in a buccopalatal direction of the tooth, as shown by the dotted arrows in FIG. 7. The dotted arrows of FIG. 7 show that the first gear 108 is rotatable in the released configuration in a counterclockwise direction and the second gear 110 is, in the released configuration, rotatable in a clockwise direction. It is also contemplated that the first gear 108 may be rotated clockwise whereas the second gear 110 may be rotated counterclockwise. The first gear 108 may be configured so that, when the first gear 108 is in the released configuration, the second gear 110 is in the locked configuration and the first gear 108 rotates in a first rotational direction so that, when the first gear 108 engages the wire in the channel 106, the bracket device 100 (and attached tooth) move along in a first longitudinal direction along the wire. The second gear 110 may be configured so that, when the second gear 110 is in the released configuration, the first gear 108 is in the locked configuration and the second gear 110 rotates in a second rotational direction opposite the first rotational direction so that, when the second gear 110 engages the wire in the channel 106, bracket device 100 (and attached tooth) move along in a second longitudinal direction along the wire, which is opposite the first longitudinal direction. It will be understood by those of skill in the art, however, that both the first and second gears 108, 110 may be alternately released to provide opposing forces and adjust the positioning of the bracket device 100 (and attached tooth) along the length of the wire.

Moreover, the channel 106 is configured to receive at least a portion of a first gear 108 and a second gear 110, each of which is independently and selectively movable between a locked configuration, in which a select one of the first and second gears 108, 110 is prevented from rotation, and a released configuration, in which the selected one of the gears 108, 110 is rotatable in either the first direction (first gear 108) or the second direction (second gear 110). The first and second gears 108, 110 engage the wire received in the channel 106. In some embodiments, the first and second gears 108, 110 may be removed from the channel 106 in a locked configuration and engage the wire only in the released configuration. In other embodiments, the first and second gears 108, 110 engage the wire in both the locked and in the released configuration. The first and second gears 108, 110 may be biased toward the released configuration via corresponding first and second biasing elements 112, 114, respectively. The first and second biasing elements 112, 114 may each independently be selected from any suitable elastic material or structure biased towards a relaxed configuration such that compressing the biasing element stores a force that may be subsequently released by relaxation of the biasing element.

As shown in FIGS. 1-10, in one exemplary embodiment, the first and second biasing elements 112, 114 are springs. The first and second biasing elements 112, 114 are initially configured to be in a compressed configuration. The first biasing element 112 may be coupled to the first gear 108. In a first initial configuration, the first gear 108 is in a locked configuration, in which the first gear 108 is prevented from rotation. The first gear 108 in the locked configuration may also be pushed against the first biasing element 112 such that the first biasing element 112 is compressed and stores a first spring compression force therein. For example, the first gear 108 may be pushed against and may compress the first biasing element 112 in a direction along an apico-coronal axis of a patient's teeth. In particular, the first gear 108 may push against and compress the first biasing element 112 in a coronal direction, and upon release of the first gear 108, the first biasing element 112 relaxes in an apical direction releasing the first spring compression force to rotate the first gear 108 in the first direction. In some embodiments, the first gear 108 in the locked configuration is engaged with, but not movable along, the wire received in channel 106. In other embodiments, the first gear 108 in the locked configuration is adjacent to the channel 106 and is not engaged with the wire received in the channel 106.

The first gear 108 may be held in the locked configuration by any suitable mechanism. For example, the first gear 108 may be held in the locked configuration by a first gear locker 172 which prevents the first gear 108 from rotating. The first gear locker 172 may be a device configured to engage an indentation of the first gear 108 and prevent further rotation of the first gear 108. The first gear locker 172 may also push the first gear 108 towards the first biasing element 112 (e.g., in a coronal direction) such that the first gear 108, in a locked configuration, compresses the first biasing element 112. The first gear 108 may be movable to a released configuration, in which the first gear 108 is rotatable in one of a first direction, e.g., corresponding to a mesial-distal direction of the teeth when the device is installed onto the teeth of a patient in a desired orientation. The first gear 108 in the released configuration may also be released, in part or completely, from being compressed against the first biasing element 112. For example, the first gear locker 172 may disengage from the first gear 108 to permit rotation of the first gear 108. The disengagement of the first gear locker 172 from the first gear 108 may also discontinue a force pushing against the first gear 108 that compresses the first biasing element 112. Upon relaxation of part or all of the first biasing element 112, a first spring compression force may be released and translated to rotational movement of the first gear 108. The rotation of the first gear 108 may be translated to a lateral movement of the orthodontic bracket 100 along the length of the wire received in the channel 106.

Similarly, the second biasing element 114 may be coupled to a second gear 110. In a second initial configuration, the second gear 110 is in a locked configuration, in which the second gear 110 is prevented from rotation. The second gear 110 in the locked configuration may also be pushed against the second biasing element 114 such that the second biasing element 114 is compressed and stores a second spring compression force therein. For example, the second gear 110 may be pushed against and may compress the second biasing element 114 in a direction along an apico-coronal axis of a patient's teeth. In particular, the second gear 110 may push against and compress the second biasing element 114 in a coronal direction, and upon release of the second gear 110, the second biasing element 114 relaxes in an apical direction releasing the second spring compression force to rotate the second gear 110 in the second direction, opposite the first direction. In some embodiments, the second gear 110 in the locked configuration is engaged with, but not movable along, the wire received in channel 106. In other embodiments, the second gear 110 in the locked configuration is adjacent to the channel 106 and is not engaged with the wire received in the channel 106.

The second gear 110 may be held in the locked configuration by any suitable mechanism. For example, the second gear 110 may be held in the locked configuration by a second gear locker 174 which prevents the second gear 110 from rotating. The second gear locker 174 may be a device configured to engage an indentation of the second gear 110 and prevent further rotation of the second gear 110 when the second gear locker 174 is engaged with the first gear 108. The second gear locker 174 may also push the second gear 110 in a direction towards the second biasing element 114 (e.g., in a coronal direction) such that the second gear 110, in a locked configuration, compresses the second biasing element 114. The second gear 110 may be movable to a released configuration, in which the second gear 110 is rotatable in a second direction, e.g., corresponding to a mesial-distal direction of the teeth when the device is installed onto the teeth of a patient in the desired orientation. The second direction may be opposite the first direction of the first gear 108. The second gear 110 in the released configuration may also be released, in part or completely, from being compressed against the second biasing element 114. For example, the second gear locker 174 may disengage from the second gear 110 to permit rotation of the second gear 110. The disengagement of the second gear locker 174 from the second gear 110 may also discontinue a force pushing against the second gear 110 that compresses the second biasing element 114. Upon relaxation of part or all of the second biasing element 114, a second spring compression force may be released and translated to rotational movement of the second gear 108. The rotation of the second gear 110 may be translated to a lateral movement of the orthodontic bracket 100 along the length of the wire received in the channel 106.

Thus, both the first and second gears 108, 110 may engage the wire received within the channel 106 in their released configurations to permit lateral movement of the bracket device 100 (and attached tooth) along the wire in a desired direction. The release of the first and/or second biasing elements 112, 114 in turn releases the corresponding gears 108, 110. The release of the first and/or second biasing elements 112, 114 provide opposing forces that may be used to adjust the lateral movement of the orthodontic bracket 100 to a desired position along the length of the wire.

In the exemplary embodiment shown in FIGS. 1-6, the body portion 101 includes an inner portion 104, and a housing portion 105 movably coupled to the inner portion 104. The inner portion 104 includes a sliding plate 146 and a protruding portion 148 extending therefrom. The sliding plate 146 is sized and shaped to be slid into the space 128 defined by the first and second rails 120, 124 of the base portion 102. The sliding plate 146 may be substantially planar, and may include a first surface 150, which, in an operative configuration, faces toward the second surface 118 of the base portion 102, and a second surface 152 substantially opposing the first surface 150.

The protruding portion 148 is sized and shaped such that the housing portion 105 is movable, and in certain embodiments, rotatably movable, with respect to the protruding portion 148. The protruding portion 148 extends from the second surface 152 of the sliding plate 146. The protruding portion 148 comprises a head portion 147 sized and shaped to be rotatably movable, with respect to the housing portion 105. The head portion 147 may have any suitable shape, for example, the head portion 147 may be substantially a hemisphere, a truncated hemisphere, obloid, a truncated obloid shape, etc. In certain embodiments, the head portion 147 and the housing portion 105 together form a ball-and-socket joint such that the head portion 147 is rotatably movable within an interior of the housing portion 105.

The protruding portion 148 may optionally include a connecting portion 149 extending from the sliding plate 146 to the head portion 147. The connecting portion 149 is sized and shaped to provide a sufficient distance between the head portion 147 and the sliding plate 146 such that the housing portion 105, when coupled to the protruding portion 148, is movable about head portion 147. However, the connecting portion 149 may be sized and shape to not exceed certain thresholds so as to avoid patient discomfort. The connecting portion 149 may have any suitable shape, such as, for example, a cylindrical shape. Alternatively, the protruding portion 148 may comprise a head portion 147 directly coupled to the sliding plate 146. The head portion 147 may be sized and shaped to be movably coupled to the housing portion 105, such that the head portion 147 is rotatably movable within an interior of the housing portion 105.

The housing portion 105, as shown in the exemplary embodiment of FIGS. 1-7, includes any suitable exterior housing comprising a cup element 164 having an interior cavity 166 suitably sized and shaped to receive the inner portion 104, in particular, a head portion 147 of a protruding portion 148 of the inner portion 104, therein. Moreover, the inner portion 104 is rotatably coupled to the housing portion 105 such that the cup element 164 is mounted over the inner portion 104. The cup element 164 is coupled to the inner portion 104 via at least one locking pin 162, e.g., a pair of locking pins 162 which are inserted through holes 168 on opposing sides of the cup element 162. In some embodiments, the locking pins 162 are configured to apply a force to an exterior surface 158 of the inner portion 104. For example, the locking pins 162 are biased to push radially inward against the exterior surface 158 of the inner portion 104. In particular, the locking pins 162 include a spring or other biasing element to exert a force against the exterior surface 158 of the inner portion 104.

The channel 106 extends through an exterior 170 of the cup element 164 so that, when the cup element 162 is mounted and fixed over the interior portion 148, a wire may be inserted into the channel 106. When the base portion 102 and the body portion 104 are fixed to a tooth in a desired orientation, the channel 106 extends substantially horizontally, e.g., in a mesial-distal direction of the tooth. In this exemplary embodiment, the first and second gears 108, 110 are mounted within the cup element 164 and biased toward the released configuration via the first and second biasing elements 112, 114 (e.g., springs) so that when either one of the first and second gears 108, 110 is in a released configuration, the gear 108, 110 extends into the channel 106 to engage the wire received therein.

Figure 3:
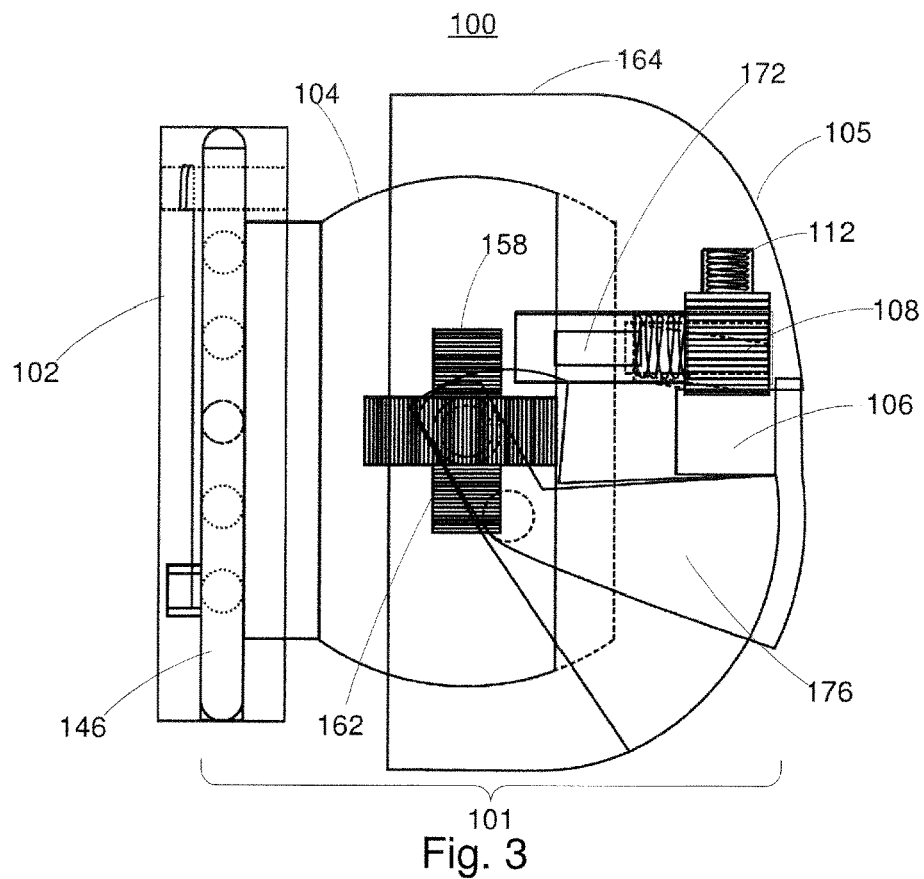
FIG. 3 a side view of the exemplary orthodontic bracket device of FIG. 1 having a bracket gate in a closed position.
Figure 4:
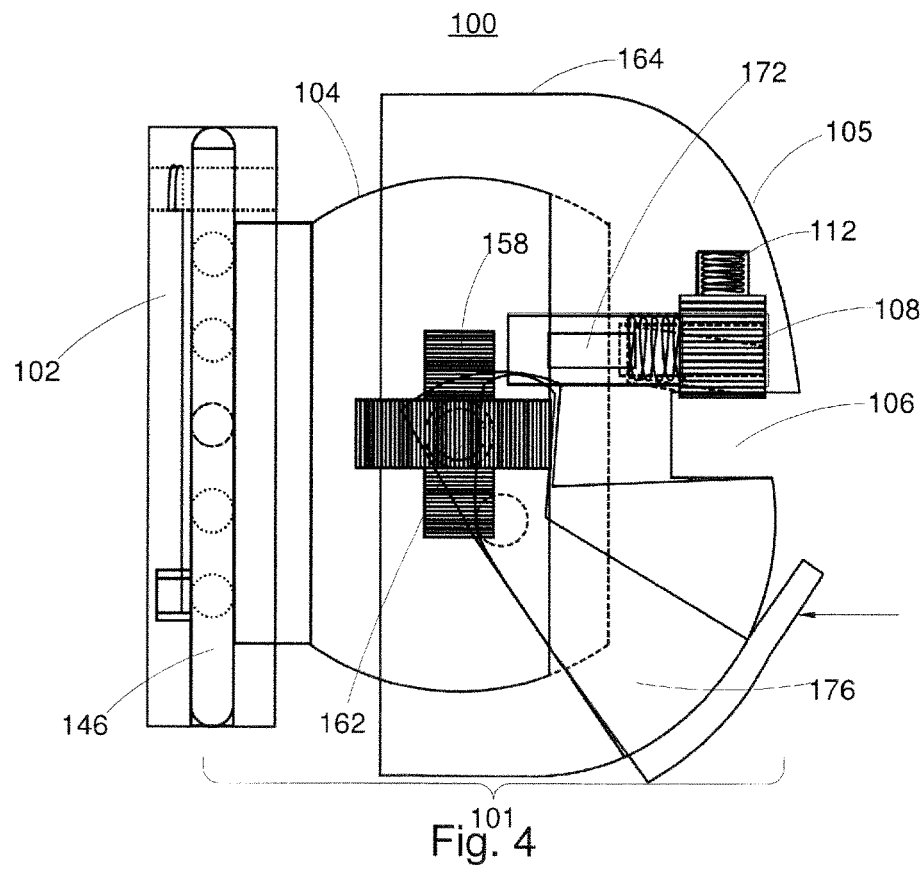
FIG. 4 a side view of the exemplary orthodontic bracket device of FIG. 1 where the bracket gate is in an open position.
Figure 5:
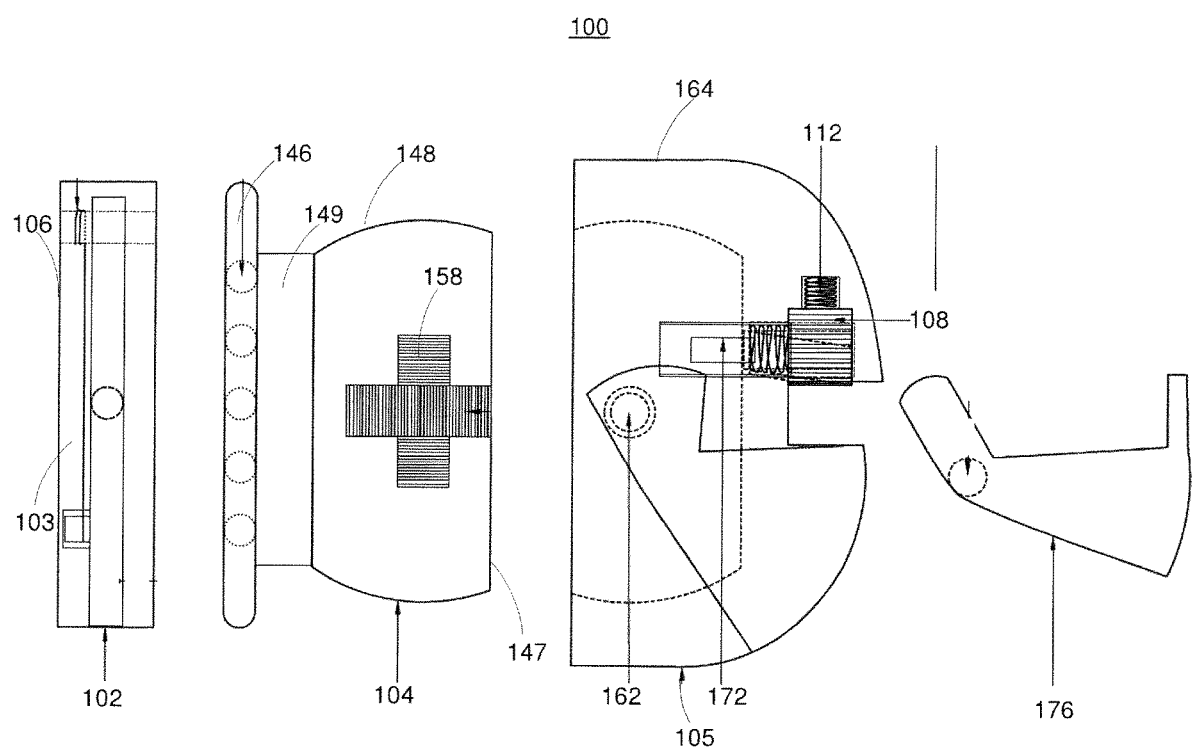
FIG. 5 an exploded side view of the exemplary orthodontic bracket device of FIG. 1.
Figure 6:
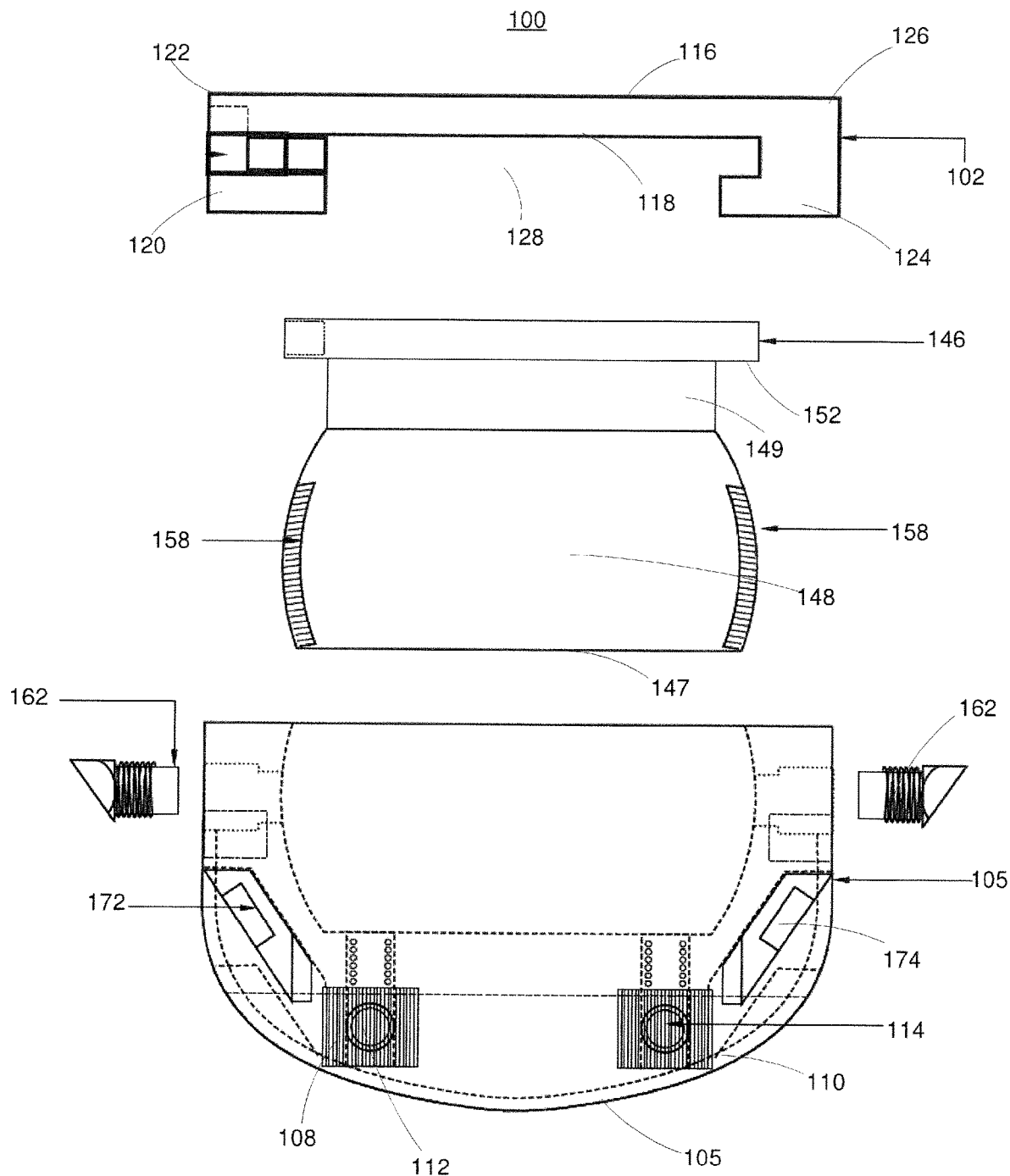
FIG. 6 an exploded top view of the exemplary orthodontic bracket device of FIG. 1

In one particular embodiment, the housing portion 105 may further include a bracket gate 176, as shown in FIGS. 3-5, pivotally coupled to the cup element 164 so that the bracket gate 176 is movable between an open position, in which the bracket gate 176 does not extend over the channel 106 so that the wire may be received therein, and a closed position, in which a portion of the bracket gate 176 extends over the channel 106 so that the wire is trapped within the channel 106. The bracket gate 176 is sized and shaped to extend about the exterior 170 of the cup element 164. In one embodiment, the bracket gate 176 is substantially curved to correspond a substantially curved exterior of the cup element 164. The bracket gate 176 may be pivotally coupled to the cup element 164 on opposing sides thereof so that portions of the bracket gate 176 interface with the locking pins 162. In a further embodiment, the bracket gate 176 may also include a window 180 extending thereinto so that, when the bracket gate 176 is in the closed position, an orthodontist or other user may access the channel 106 or portions of the housing portion 105 by inserting any suitable instrument for manipulating the wire through the window 180.

In some embodiments, as shown in the exemplary embodiments of FIGS. 1-7, the first and second gears 108, 110 along with the first and second biasing elements 112, 114 are incorporated into the body portion 101 of the orthodontic bracket 100, in particular, the housing portion 105. For example, the first and second biasing elements 112, 114 are mounted on an interior surface of a wall of the cup element 164 such that it extends into the interior cavity 166. The first and second biasing elements 112, 114 are compressible along an axis tangential to the interior surface of the wall of the cup element 164. The first and second biasing elements 112, 114 are aligned to movably engage with the corresponding gears 108, 110. The first and second gears 108, 110 are aligned with the channel 106 such that the gears 108, 110 engage a wire received therein in at least the relaxed configuration. The first and second gears 108, 110 may also engage the wire received within the channel 106 in the locked configuration. The first and second gears 108, 110 may be removed the channel 106 in the locked configuration or may be positioned partially within the channel 106 in the locked configuration.

Figure 2:
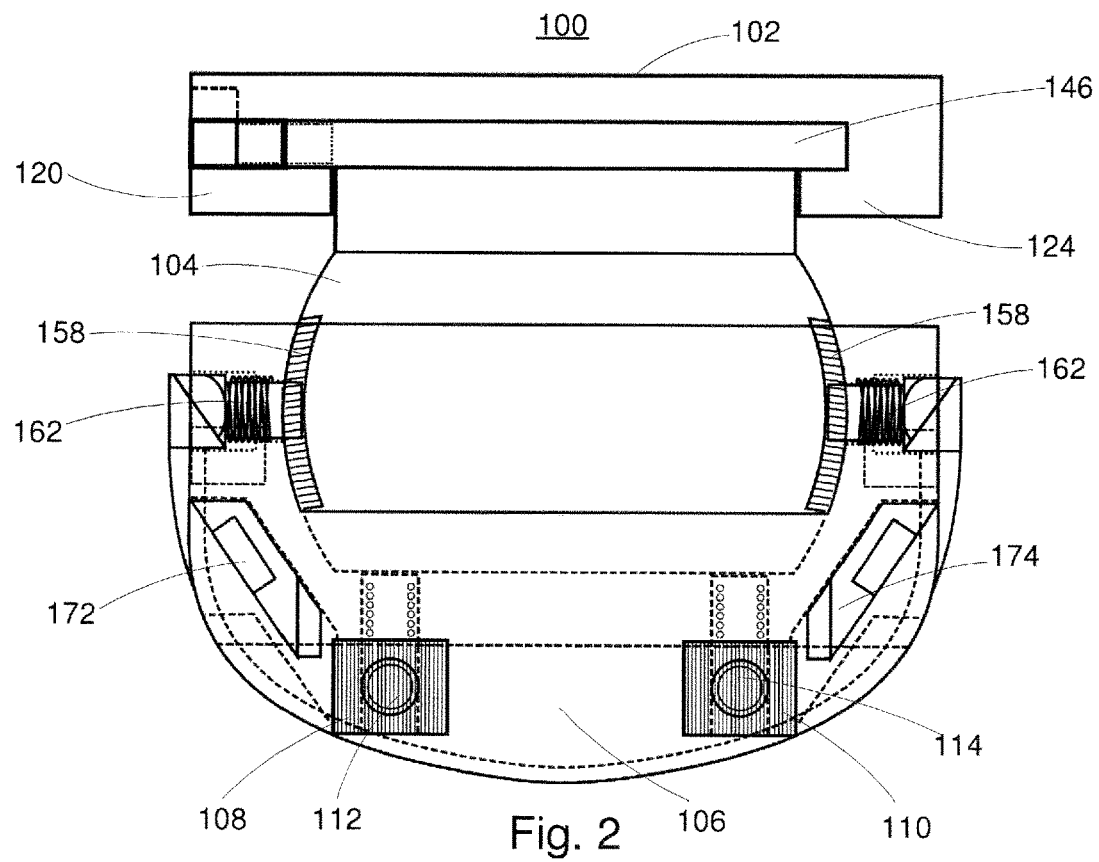
FIG. 2 a top view of the exemplary orthodontic bracket device of FIG. 1.

The first and second gear lockers 172, 174 extend from an exterior surface of the housing portion 105 through a wall of the housing portion 105 to engage the first and second gears 108, 110 respectively. The first and second gear locks 172, 174 are movably mounted within the cup element 164 and configured to reversibly engage the first and second gears 108, 110, respectively. When the first and second gear locks 172, 174 are moved toward the first and second gears 108, 110, respectively, a portion of the first and second gear locks 172, 174 engage a portion of the first and second gears 108, 110, moving the first and second gears 108, 110 toward a locked configuration—e.g., out of the channel 106, thereby compressing the first and second biasing elements 112, 114. As shown in the exemplary embodiment of FIG. 2, the first gear lock 172 is engaged with the first gear 108 and therefore, also pushes the first gear 108 to compresses the first biasing element 112. The exemplary embodiment of FIG. 2 shows the second gear lock 174 disengaged from the second gear 110 and therefore, the second gear 110 is rotatable and the second biasing element 114 is in a relaxed configuration. Thus, when both the first and second gears 108, 110 are moved toward the locked position, the wire may be freely slidable within the channel 106. The first and second gear locks 172, 174, however, are selectively movable so that the first and gear locks 108, 110 move independently of one another. Thus, if so desired, only one of the first gear 108 or second gear 110 may be moved toward the locked configuration so that only one of the first and second gear 108, 110 may remain engaged with the wire received within the channel 106 to move the wire in a desired longitudinal direction with respect to the channel 106. The first and second gear locks 172, 174 include any suitable mechanism for reversibly engaging the first and second gears 108, 110, respectively. In one exemplary embodiment, either one or both of the first and second gear locks 172, 174 comprise a locking lever pivotally movable between a locking position in which the locking lever compresses the biasing element, and a release position in which the locking lever is pivoted away from the biasing element.

The base portion 102, as shown in FIGS. 1-6, may include a substantially planar component 103 (alternatively, this component 103 may be substantially flat and may be shaped to substantially conform to the contours of a tooth) having a first surface 116 which, in an operative configuration, is attached to a surface of a tooth, and a second surface 118 opposing the first surface 116. The substantially planar component 103 may also include a first side 122 and a second side 126 opposite the first side. The second surface 118 may include a first rail 120 on the first side 122 along the second surface 118 and a second rail 124 on the second side 126 extending along the second surface 118. The first and second rails 120 and 124 may extend substantially parallel to one another. A space 128 defined between the first and second rails 120, 124 and the second surface 118 is sized and shaped to slidably receive a correspondingly sized and shaped portion of the body portion 101 therein. In one embodiment, the space 128 is sized and shaped to slidably receive a correspondingly sized and shape portion of the inner portion 104 therein. For example, the sliding plate 146 may be slid into the space 128 along the first and second rails 120, 124 of the base portion 102.

In an alternative embodiment, a separate orthodontic device may comprise a substantially similar biasing mechanisms as that described above with respect to bracket device 100, except this separate device is not fixed to a tooth of a patient. As shown in FIGS. 17-19, an orthodontic device 300 according to another exemplary embodiment of the present invention, comprises a body portion 301. In particular, the body portion 301 may have any suitable size and shape for fitting between two orthodontic brackets in an operating configuration (e.g., attached to the teeth). In one exemplary embodiment, the body portion 301 may have an ovoid shape. The body portion 301 may be a housing that encloses one or more biasing mechanisms therein. The body portion 301 may have any suitable configuration including a channel 306 for receiving a wire therethrough. In particular, the body portion 301 may include a movable portion that can be manipulated to an open configuration permitting a wire to be inserted lengthwise into channel 306, and a closed configuration where the movable portion is closed to surround the length of the wire.

In one particular embodiment, the body portion 301 may include a gate, as shown in FIGS. 17-19, pivotally coupled to the body portion 301 so that the gate 376 is movable between an open position, in which the gate 376 does not extend over the channel 306 so that the wire may be received therein, and a closed position, in which a portion of the gate 376 extends over the channel 306 so that the wire is trapped within the channel 306. The gate 376 is sized and shaped to extend about the exterior the body portion 301. In one embodiment, the gate 376 is substantially curved to correspond a substantially curved exterior of the body portion 301. The gate 376 may be pivotally coupled to the body portion 301 on opposing sides thereof. In a further embodiment, the gate 376 may also include a window 380 extending thereinto so that, when the gate 376 is in the closed position, an orthodontist or other user may access the channel 306 by inserting any suitable instrument for manipulating the wire through the window 380.

The body portion 301 includes one or more biasing mechanisms, e.g., springs, to impart a force for adjusting the positioning of an adjacent tooth. In one exemplary embodiment, the body portion 301 includes at least one spring in a compressed configuration coupled to a gear such that upon relaxation of part or all of the spring, a spring compression force is released and translates into rotational movement of the gear. Each gear is positioned adjacent to the channel 306, and is independently movable between a locked position in which the gear is prevented from rotation and a released configuration in which the spring is at least partially uncompressed and the gear is rotatable to move along a wire received within the channel 306 in a desired direction.

In one exemplary embodiment, the body portion 301 may includes a first gear 308 and a second gear 310. As shown in FIGS. 17 and 19, the first and second gears 308, 310 may be positioned on opposite sides of channel 306, and in certain embodiments, may be aligned with each other. The first and second gears 308, 310 may include a plurality of corrugations around the circumferences of each of the first and second gears 308, 310. The peaks and indentations surrounding each gear 308, 310 may have any desired size and shape. In one particular embodiment, each gear 308, 110 has a corrugated shape with uniformly sized and shaped peaks and indentations around the circumference thereof.

The first gear 308, in this embodiment, is rotatable in a first direction while the second gear 310 is rotatable in a second direction opposite the first direction. In the released configuration, either the first gear 308 or the second gear 310 is rotatable about a central axis, which may, for example, be in a buccopalatal direction of the tooth. The first gear 308 is rotatable in the released configuration in a counterclockwise direction and the second gear 310 is, in the released configuration, rotatable in a clockwise direction. It is also contemplated that the first gear 308 may be rotated clockwise whereas the second gear 310 may be rotated counterclockwise. The first gear 308 may be configured so that, when the first gear 308 is in the released configuration, the second gear 310 is in the locked configuration and the first gear 308 rotates in a first rotational direction so that, when the first gear 308 engages the wire in the channel 306, the device 300 move along in a first longitudinal direction along the wire to push against an adjacent tooth. The second gear 310 may be configured so that, when the second gear 310 is in the released configuration, the first gear 308 is in the locked configuration and the second gear 310 rotates in a second rotational direction opposite the first rotational direction so that, when the second gear 310 engages the wire in the channel 306, device 300 move along in a second longitudinal direction along the wire, which is opposite the first longitudinal direction. It will be understood by those of skill in the art, however, that both the first and second gears 308, 310 may be alternately released to provide opposing forces and adjust the positioning of the device 300 along the length of the wire.

Moreover, the channel 306 is configured to receive at least a portion of a first gear 308 and a second gear 310, each of which is independently and selectively movable between a locked configuration, in which a select one of the first and second gears 308, 310 is prevented from rotation, and a released configuration, in which the selected one of the gears 308, 310 is rotatable in either the first direction (first gear 308) or the second direction (second gear 310). The first and second gears 308, 310 engage the wire received in the channel 306. In some embodiments, the first and second gears 308, 310 may be removed from the channel 306 in a locked configuration and engage the wire only in the released configuration. In other embodiments, the first and second gears 308, 310 engage the wire in both the locked and in the released configuration. The first and second gears 308, 310 may be biased toward the released configuration via corresponding first and second biasing elements 312, 314, respectively. The first and second biasing elements 312, 314 may each independently be selected from any suitable elastic material or structure biased towards a relaxed configuration such that compressing the biasing element stores a force that may be subsequently released by relaxation of the biasing element.

As shown in the exemplary embodiment of FIGS. 17-19, the first and second biasing elements 312, 314 are springs. The first and second biasing elements 312, 314 are initially configured to be in a compressed configuration. The first biasing element 312 may be coupled to the first gear 308. In a first initial configuration, the first gear 308 is in a locked configuration, in which the first gear 308 is prevented from rotation. The first gear 308 in the locked configuration may also be pushed against the first biasing element 312 such that the first biasing element 312 is compressed and stores a first spring compression force therein. For example, the first gear 308 may be pushed against and may compress the first biasing element 312 in a direction along an apico-coronal axis of a patient's teeth. In particular, the first gear 308 may push against and compress the first biasing element 312 in a coronal direction, and upon release of the first gear 308, the first biasing element 312 relaxes in an apical direction releasing the first spring compression force to rotate the first gear 308 in the first direction. In some embodiments, the first gear 308 in the locked configuration is engaged with, but not movable along, the wire received in channel 306. In other embodiments, the first gear 308 in the locked configuration is adjacent to the channel 306 and is not engaged with the wire received in the channel 306.

The first gear 308 may be held in the locked configuration by any suitable mechanism. For example, the first gear 308 may be held in the locked configuration by a first gear locker 372, which prevents the first gear 308 from rotating. The first gear locker 372 may be a device configured to engage an indentation of the first gear 308 and prevent further rotation of the first gear 308. The first gear locker 372 may also push the first gear 308 towards the first biasing element 312 (e.g., in a coronal direction) such that the first gear 308, in a locked configuration, compresses the first biasing element 312. The first gear 308 may be movable to a released configuration, in which the first gear 308 is rotatable in one of a first direction, e.g., corresponding to a mesial-distal direction of the teeth when the device is installed onto the teeth of a patient in a desired orientation. The first gear 308 in the released configuration may also be released, in part or completely, from being compressed against the first biasing element 312. For example, the first gear locker 372 may disengage from the first gear 308 to permit rotation of the first gear 308. The disengagement of the first gear locker 372 from the first gear 308 may also discontinue a force pushing against the first gear 308 that compresses the first biasing element 312. Upon relaxation of part or all of the first biasing element 312, a first spring compression force may be released and translated to rotational movement of the first gear 308. The rotation of the first gear 308 may be translated to a lateral movement of the device 300 along the length of the wire received in the channel 306.

Similarly, the second biasing element 114 may be coupled to a second gear 110. In a second initial configuration, the second gear 110 is in a locked configuration, in which the second gear 110 is prevented from rotation. The second gear 110 in the locked configuration may also be pushed against the second biasing element 114 such that the second biasing element 114 is compressed and stores a second spring compression force therein. For example, the second gear 110 may be pushed against and may compress the second biasing element 114 in a direction along an apico-coronal axis of a patient's teeth. In particular, the second gear 110 may push against and compress the second biasing element 114 in a coronal direction, and upon release of the second gear 110, the second biasing element 114 relaxes in an apical direction releasing the second spring compression force to rotate the second gear 110 in the second direction, opposite the first direction. In some embodiments, the second gear 110 in the locked configuration is engaged with, but not movable along, the wire received in channel 106. In other embodiments, the second gear 110 in the locked configuration is adjacent to the channel 106 and is not engaged with the wire received in the channel 106.

The second gear 310 may be held in the locked configuration by any suitable mechanism. For example, the second gear 310 may be held in the locked configuration by a second gear locker 374 which prevents the second gear 310 from rotating. The second gear locker 374 may be a device configured to engage an indentation of the second gear 310 and prevent further rotation of the second gear 310 when the second gear locker 374 is engaged with the first gear 308. The second gear locker 374 may also push the second gear 310 in a direction towards the second biasing element 314 (e.g., in a apical direction) such that the second gear 310, in a locked configuration, compresses the second biasing element 314. The second gear 310 may be movable to a released configuration, in which the second gear 310 is rotatable in a second direction, e.g., corresponding to a mesial-distal direction of the teeth when the device is installed onto the teeth of a patient in the desired orientation. The second direction may be opposite the first direction of the first gear 308. The second gear 310 in the released configuration may also be released, in part or completely, from being compressed against the second biasing element 314. For example, the second gear locker 374 may disengage from the second gear 310 to permit rotation of the second gear 310. The disengagement of the second gear locker 374 from the second gear 310 may also discontinue a force pushing against the second gear 310 that compresses the second biasing element 314. Upon relaxation of part or all of the second biasing element 314, a second spring compression force may be released and translated to rotational movement of the second gear 308. The rotation of the second gear 310 may be translated to a lateral movement of the device 300 along the length of the wire received in the channel 306.

Thus, both the first and second gears 308, 310 may engage the wire received within the channel 306 in their released configurations to permit lateral movement of the device 300 along the wire in a desired direction. The release of the first and/or second biasing elements 312, 314 in turn releases the corresponding gears 308, 310. The release of the first and/or second biasing elements 312, 314 provide opposing forces that may be used to adjust the lateral movement of the orthodontic device 300 to a desired position along the length of the wire.

The orthodontic device 100, 300 may further include additional functionalities such as a vibration mechanism configured to administer a mechanical vibration. For example, the bracket device 100 may include a vibration module, in particular the body portion 101 and/or the base portion 102 may include a vibration mechanism that is configured to administer a mechanical vibration to the tooth to which the bracket device 100 is attached in an operating configuration. As another example, the device 300 may include a vibration module, in particular the body portion 301 may include a vibration mechanism that is configured to administer a mechanical vibration to an adjacent tooth when the device is attached to an archwire and fitted adjacent to an orthodontic bracket, more particularly, between two orthodontic brackets.

The bracket device 100 described above may be configured to be receive a conventional orthodontic wire therein or, in another embodiment, may be configured to receive a corrugated wire 200 therein, as shown in FIGS. 11-16, and as will be described in further detail below. Alternatively, a separate orthodontic device 300 sized and shaped to fit between two orthodontic brackets in an operating configuration (e.g., attached to the teeth of a patient) may also be configured to receive the corrugated wire 200 shown in FIGS. 11-16 therein. The combination of the exemplary orthodontic devices (e.g., orthodontic brackets 100 and/or separate device 300) and a corrugated wire 200 may be configured to produce a desired amount of force as selected by the clinician/orthodontist and, and translate the orthodontic device (e.g., bracket device 100 attached to a tooth or separate device 300 pushing against an orthodontic bracket attached to a tooth) a desired length along the wire 200, without unnecessary force or movement. The corrugated wire 200 extends from a first end 202 to a second end 204 and includes corrugations formed as, for example, a plurality of grooves 206 and peaks 207 along a length thereof. The grooves 206 and peaks 207 may have different sizes and shapes. In one particular embodiment, grooves 206 and peaks 207 may be uniformly sized and shaped along the length of the corrugated wire 200. The amount of force for lateral translation of the exemplary orthodontic brackets in a mesial-distal direction along the wire 200 may be controlled or limited by the shape of the wire itself, specifically, the corrugated shape of the wire 200. For example, a distance between grooves 206 and peaks 207 and/or height of the grooves 206 and peaks 207 of the corrugated wire 200 may limit a magnitude of force, continuity of force, and/or period of activation that is imparted from the release of a spring compression force from the orthodontic bracket 100 to the target tooth. More particularly, a change in the size (e.g., length and/or height) of grooves 206 and/or peaks 207 of the wire 200 may alter the amount of friction between the first and/or second gear 108, 110 (or first and/or second gear 308, 310) and the wire 200. For example, an increase in either a length or a width of grooves 206 and/or peaks 207 may significantly increase an amount of friction between the first and/or second gears 108, 110 and the wire 200. The amount of force available for rotating the first and/or second gears 108, 110 is determined by the first and/or second biasing elements 112, 114, respectively. The first and/or second spring compression force may be released upon relaxation of the corresponding first and/or second biasing elements 112, 114. However, the distance on the wire 200 travelled by the first and/or gears 108, 110, upon release of the first and/or second biasing elements 112, 114, is reduced when the size of grooves 206 and/or peaks 207 are larger, because the larger grooves 206 and/or peaks 207 significantly increase an amount of friction between the first and/or second gears 108, 110 and the wire 200. The increased friction therefore reduces the amount of force applied to move the bracket device 100 (and a tooth) along the wire 200. Therefore, not only by changing the intervals of peak 207, but also by changing the height of peaks 207 or thickness of peaks 207 and width of grooves 206, it is possible to control the magnitude of force that is delivered from the bracket device 100 to the tooth. However, the amount of force applied to the tooth cannot exceed the first and/or second spring compression force stored within the first and/or second biasing elements 112, 114.

In one particular embodiment, the grooves 206 and peaks 207 may be sized and shaped to engage the first and second gears 108, 110, more particularly, the peaks and indentations of the first and/or second gears 108, 110 described above. The grooves 206 and peaks 207 may be one-for-one interlocked with the peaks and indentations of the first and/or second gears 108, 110. Alternatively, more than one grooves 206 and peaks 207 (e.g., two, three, four, five, etc.) may interlock with each pair of peak and indentation of the first and/or second gears 108, 110. The first and second gears 108, 110 may generally be locked and prevented from rotation until a clinician disengages the first and/or second gear locks 172, 174 to release the first and/or second spring compression forces, respectively. In one embodiment, the first and/or second gears 108, 110 gradually release the first and/or second spring compression. Specifically, the first and/or second gear 108, 110 engages with a wire received in the channel 106, wherein the friction between the first and/or second gears are sufficiently high such that release of the first and second spring compression forces are moderated to gradually rotate the first and/or second gears 108, 110 in a mesial-distal direction along the wire.

Figure 11:
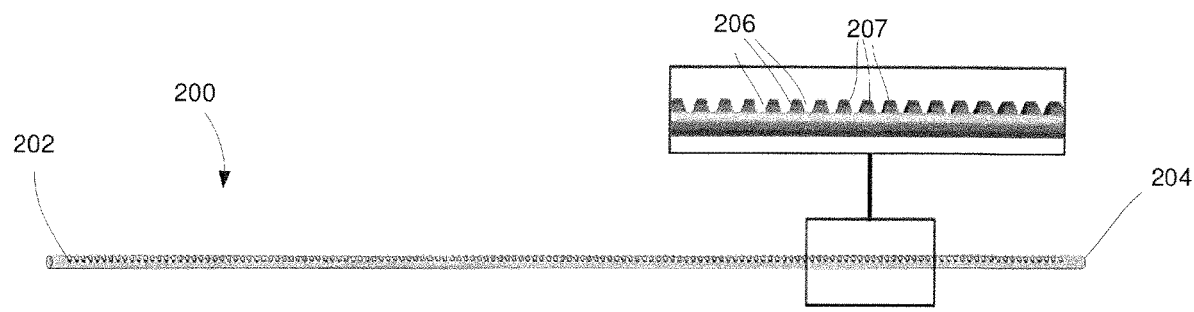
FIG. 11 shows a top view of a wire according to an exemplary embodiment of the present invention.
Figure 12:
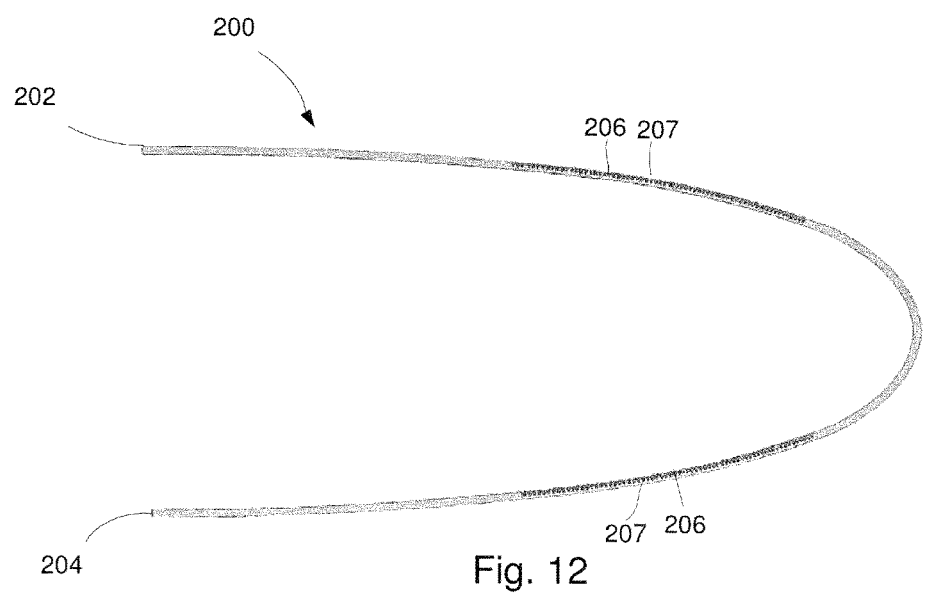
FIG. 12 shows a top view of a wire according to another exemplary embodiment of the present invention.
Figure 13:
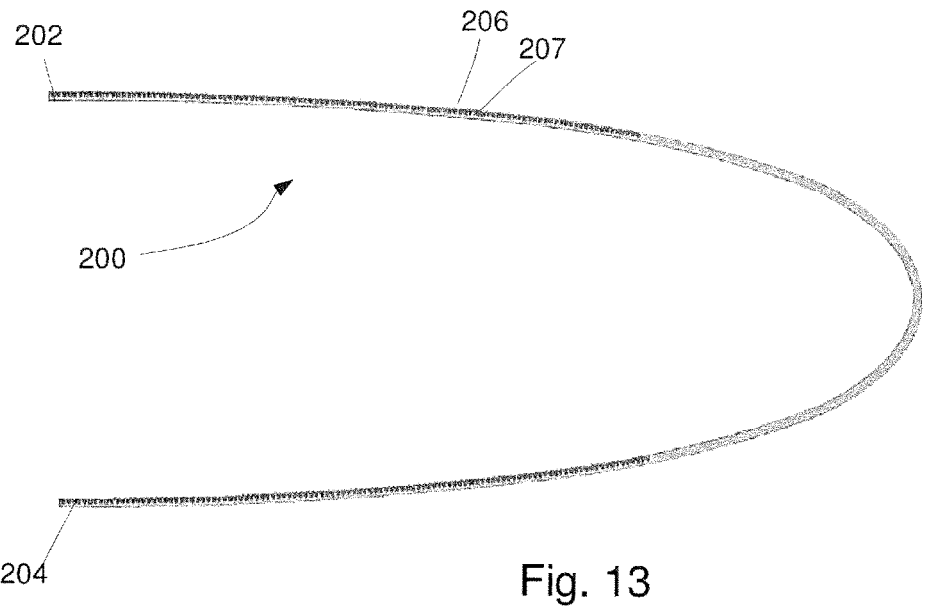
FIG. 13 shows a top view of a wire according to yet another exemplary embodiment of the present invention.
Figure 14:
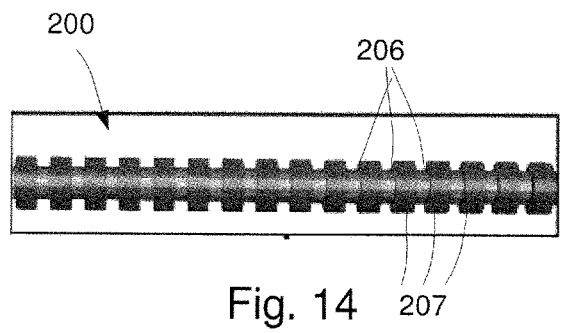
FIG. 14 shows a longitudinal side view of a portion of a wire according to another exemplary embodiment of the present invention.

The grooves 206 may extend along one side of the wire 200, as shown in FIGS. 11-13, or, alternatively, may extend about an entire perimeter of the wire 200, as shown in FIG. 14. Additionally, the grooves 206 may extend along an entire length of the wire 200, as shown in FIG. 11, or may extend along desired portions of the wire. For example, as shown in FIG. 12, an anterior portion of the wire 200 may be corrugated with grooves 206 so that a bracket device 100 on one canine tooth, or a separate device adjacent to a bracket on the canine tooth, on a first side of a mouth may be connected to a bracket device 100 on a second canine tooth, or a separate device 300 adjacent to a second bracket on the second canine tooth, on a second side of the mouth. In another example, as shown in FIG. 13, a posterior portion of the wire 200 may be corrugated with grooves so bracket devices 100 on canines and molars, and/or separate orthodontic devices 300 adjacent to brackets attached to canine and molars, may be connected.

Figure 15:
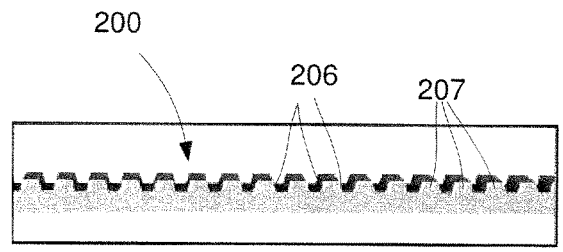
FIG. 15 shows a longitudinal cross-sectional view of a portion of a wire according to another exemplary embodiment of the present invention.
Figure 16:
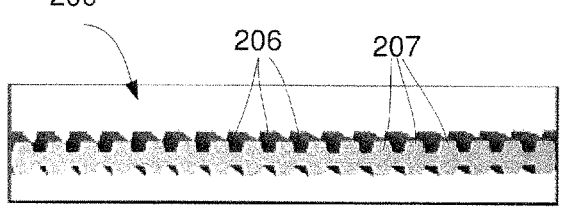
FIG. 16 shows a longitudinal cross-sectional view of a portion of the wire according to yet another exemplary embodiment of the present invention.

The wire 200 may have any suitable cross-sectional shape. For example, wire 200 may have a circular cross-section, as shown in FIGS. 11-14, or, alternatively, may have a rectangular cross-section, as shown in FIG. 15-16. Additionally, corrugations may extend along one side or about the entire perimeter, or along different portions of the wire 200, as described above, regardless of the shape of the wire 200. The wires 200 may have different sizes (e.g., from about 0.012 to about 0.027 inches), shapes (e.g., round or rectangular), and materials (e.g., Nitinol, stainless steel, or titanium-molybdenum alloy (TMA)) to provide the required force and/or moment for alignment of teeth of a patient. For example, the wire 200 may extend substantially straight, as shown in FIG. 22, or along an arch, as shown in FIGS. 23-24. The wire 200 may be formed in a variety of sizes. For example, the wire may have a diameter of 0.016, 0.018 or 0.020 inches for round wires or dimensions of 0.018 in.× 0.018 in, 0.016 in.×0.022 in., or 0.017 in.×0.025 in. for rectangular wires. The wire 200 may comprise or be formed of any suitable orthodontic materials. In certain embodiments, the wire 200 may be formed using a metallic material. In other embodiments, the wire 200 may be formed using a shape-memory metallic material. In certain example, the wire 200 may comprise materials Nitinol, stainless steel, and/or titanium-molybdenum alloy (TMA).

Some of the side effects of having dental brackets/braces include dental caries, which may be caused by improper oral hygiene of the patient when the brackets are in place. Therefore, it is contemplated that any portion or all of each of the orthodontic device 100, 300 and/or archwire 200 may include a coating comprising an agent, such as for example, a pharmaceutically active agent. The coating may be applied, for example, to any external surface of the orthodontic device 100, 300. In particular, the coating may be applied to the body portion 101, 301 of the device 100, 300. In another example, the coating may be applied to an inner portion 104 and/or a housing portion 105 of an orthodontic bracket 100. The coating may also be applied, for example, to an interior surface of a channel 106, 306 extending through the body portion 101, 301, or to any portion of the biasing mechanisms, e.g., springs, gears, or locking pins. As another example, the coating may be applied to a base portion 102 of an orthodontic bracket 100. Furthermore, the coating may be applied to any portion of the archwire 200. For example, the coating may be applied to the grooves 206 and/or peaks 207 of a corrugated portion of the archwire 200. As another example, the coating may be applied to an uncorrugated portion of the archwire 200. In one particular example, the archwire 200 may comprise both a corrugated portion and an uncorrugated portion, where the corrugated portion is uncoated and the uncorrugated portion includes the coating. Alternatively, the corrugated portion may include the coating, while the uncorrugated portion is uncoated. The coating may comprise any suitable formulation for releasing the agent therefrom, and may include formulations that promote rapid release, controlled release and/or extended release of the agent from the coating. The coating may comprise one or more active agents that are suitable for promoting dental health and/or hygiene, e.g., prevention and/or reducing formation of dental caries, prevention and/or reducing formation of biofilms on teeth, prevention and/or amelioration of demineralization of the teeth. For example, the active agents may comprise, but is not limited to, anti-bacterial compounds (e.g., Nanosilver), or fluoride. In one example, an orthodontic device (e.g., bracket devices 100 and/or separate devices fitted between two orthodontic brackets 300) and/or archwire 200 may be coated with a composition that delivers or provides controlled release of anti-bacterial compounds, e.g., coatings with Nanosilver. In another example, an orthodontic device (e.g., bracket devices 100 and/or separate devices fitted between two orthodontic brackets 300) and/or archwire 200 may be coated with a fluoride releasing coating to prevent tooth demineralization.

According to an exemplary method, a plurality of orthodontic devices (e.g., bracket devices 100 or separate devices fitted between two orthodontic brackets 300) may be used to treat an orthodontic patient. In one example, a base portion 102 for each bracket device 100 may be adhered or otherwise attached to a tooth of the patient. Upon attachment of the base portion 102 to the tooth, the body portion 101 may be coupled to each base portion 102 attached to a tooth. The sliding plate 146 may be slid into the space 128 between the first and second rails 120, 124 of the base portion 102. Once the body portion 104 has been fixed relative to the base portion 102, the bracket gate 176 may be moved to the open position so that a wire may be inserted into the channel 106 and the housing portion 105 may be adjusted relative to the body portion 104, as desired. To insert the wire into the channel 106, both the first and second gears 108, 110 are moved toward the locked configurations. The positioning of each of the orthodontic devices are individually adjusted by disengaging one or both of the first and second gear locks of each device and thereby releasing the first and/or second spring compression force and rotating the first and/or second gears and translating the device along a mesial-distal direction along the wire. For example, the positioning of each of the bracket devices 100 are individually adjusted by disengaging one or both of the first and second gear locks and thereby releasing the first and/or second spring compression force and rotating the first and/or second gears 108, 110 and translating the bracket 100 along a mesial-distal direction along the wire. It will be understood by those of skill in the art that each of the orthodontic devices may be adjusted, as described above, to achieve a desired spacing between teeth. Each of the orthodontic devices may be continuously adjusted during the course of treatment.

It will be apparent to those skilled in the art that various modifications may be made in the present disclosure, without departing from the scope of the disclosure. Thus, it is intended that the present disclosure cover modifications and variations of this disclosure provided that they come within the scope of the appended claims and their equivalents.

The orthodontic device described above generates sufficient force to adjust the positioning of the bracket device relative to the wire and does not require application of external forces. Accordingly, the orthodontic device as described herein provides a way to eliminate the need for an external source for adjustments to orthodontic braces. In particular, the orthodontic device eliminates the need for application of springs, power chains, power treads, or other sources of external forces, which have typically required constant replacement to compensate for their quick force decay and caused irritation to the patient, including application of an excessive force on anchor tooth or teeth.

Furthermore, this device may eliminate the need for reactivation, which further streamlines adjustments to orthodontic braces and saves significant chair-side time for the orthodontist.

The invention described and claimed herein is not to be limited in scope by the specific embodiments herein disclosed since these embodiments are intended as illustrations of several aspects of this invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims. All publications cited herein are incorporated by reference in their entirety.

What is claimed is:

1. An orthodontic device for imparting a force in a mesial-distal direction of a tooth, comprising:
    a body portion having a channel extending therethrough from a first end to a second end, the channel being configured to slidably receive an archwire therein;
    a first gear coupled to the body portion, the first gear being movable between a first locked configuration in which the first gear is prevented from rotation, and a first released configuration in which the first gear engages the archwire received within the channel and is rotatable to move the device along the archwire in a first direction;
    a second gear coupled to the body portion, the second gear being movable between a second locked configuration in which the second gear is prevented from rotation, and a second released configuration in which the second gear engages the archwire received within the channel and is rotatable to move the device along the archwire in a second direction opposite the first direction; and
    a first biasing element biasing the first gear towards the first released configuration,
    wherein the first gear is biased towards the first released configuration, and the second gear is biased towards the second released configuration and
    wherein the first biasing element is compressed when the first gear is in the first locked position such that release of the first biasing element imparts a first force to rotate the first gear in the first direction.

2. The orthodontic device of claim 1, further comprising a base portion configured to be attached to a surface of a tooth, wherein the body portion is removably attachable to the base portion.

3. The orthodontic device of claim 1, wherein the device is reversibly attachable to the archwire between a first orthodontic bracket attached to a first tooth and a second orthodontic bracket attached to a second tooth adjacent to the first tooth.

4. The orthodontic device of claim 1, further comprising a first locking lever pivotally movable between a first locking position in which the first locking lever compresses the first biasing element and a first release position in which the first locking lever is pivoted away from the first biasing element.

5. The orthodontic device of claim 1, further comprising a second biasing element biasing the second gear towards the second released configuration.

6. The orthodontic device of claim 5, wherein the second biasing element is compressed when the second gear is in the second locked position such that release of the second biasing element imparts a second force to rotate the second gear in the second direction.

7. The orthodontic device of claim 5, further comprising:
    a first locking lever pivotally movable between a first locking position in which the first locking lever compresses the first biasing element and a first release position in which the first locking lever is pivoted away from the first biasing element; and
    a second locking lever pivotally movable between a second locking position in which the second locking lever compresses the second biasing element and a second release position in which the second locking lever is pivoted away from the second biasing element.

8. An orthodontic system comprising:
    an archwire;
    a device having a channel extending from a first end to a second end therethrough, the channel configured to slidably receive an archwire therethrough;
    a first gear coupled to the device, the first gear being movable between a first locked configuration in which the first gear is prevented from rotation, and a first released configuration in which the first gear engages the archwire received within the channel and is rotatable to move the device along the archwire in a first direction;
    a first spring biasing the first gear towards the first released configuration; and
    a second gear coupled to the device, the second gear being movable between a second locked configuration in which the second gear is prevented from rotation, and a second released configuration in which the second gear engages the archwire received within the channel and is rotatable to move the device along the archwire in a second direction opposite the first direction,
    wherein the first spring is compressed when the first gear is in the first locked position such that release of the first spring imparts a first force to rotate the first gear in the first direction.

9. The orthodontic system of claim 8, further comprising a first locking lever pivotally movable between a first locking position in which the first locking lever compresses the first spring and a first release position in which the first locking lever is pivoted away from the first spring.

10. The orthodontic system of claim 8, wherein the archwire has a circular or rectangular cross-sectional shape.

11. The orthodontic system of claim 8, wherein at least a portion of the archwire is corrugated.

12. The orthodontic system of claim 11, wherein the corrugation includes a plurality of grooves around a cross-section of the archwire.

13. The orthodontic system of claim 11, wherein the corrugation includes a plurality of grooves extending half of a cross-section circumference of the archwire.

14. The orthodontic system of claim 8, further comprising:
    a first orthodontic bracket attached to a first tooth, and
    a second orthodontic bracket attached to a second tooth adjacent to the first tooth,
    wherein the device is reversibly attachable to the archwire between the first and second orthodontic brackets.

15. The orthodontic system of claim 8, wherein the device is an orthodontic bracket.

16. An orthodontic device comprising:
    a body portion having a channel extending therethrough from a first end to a second end, the channel being configured to slidably receive an archwire therein;

a first gear coupled to the body portion, the first gear being movable between a first locked configuration in which the first gear is prevented from rotation, and a first released configuration in which the first gear engages the archwire received within the channel and is rotatable to move the device along the archwire in a first direction;

a second gear coupled to the body portion, the second gear being movable between a second locked configuration in which the second gear is prevented from rotation, and a second released configuration in which the second gear engages the archwire received within the channel and is rotatable to move the device along the archwire in a second direction opposite the first direction;

a first biasing element biasing the first gear towards the first released configuration; and a second biasing element biasing the second gear towards the second released configuration, wherein the second biasing element is compressed when the second gear is in the second locked position such that release of the second biasing element imparts a second force to rotate the second gear in the second direction.

* * * * *